United States Patent [19]
Kuusinen

[11] Patent Number: 5,287,540
[45] Date of Patent: Feb. 15, 1994

[54] DIGITAL DETECTOR

[75] Inventor: Tero Kuusinen, Salo, Finland

[73] Assignee: Nokia Mobile Phones Ltd., Salo, Finland

[21] Appl. No.: 967,512

[22] Filed: Oct. 28, 1992

[30] Foreign Application Priority Data

Nov. 1, 1991 [FI] Finland .................................. 915179

[51] Int. Cl.[5] ..................................... H03D 3/00
[52] U.S. Cl. ......................................... 375/89; 375/94
[58] Field of Search .................... 375/75, 76, 88, 89, 375/94, 20, 17; 455/205, 208; 329/300

[56] References Cited

U.S. PATENT DOCUMENTS

| | | | |
|---|---|---|---|
| 3,860,874 | 1/1975 | Malone et al. | 375/89 |
| 4,086,430 | 4/1978 | Brown | 375/89 |
| 4,479,229 | 10/1984 | Walters | 375/89 |
| 4,554,509 | 11/1985 | Cornett | 329/300 |
| 4,873,702 | 10/1989 | Chiu | 375/76 |
| 4,897,857 | 1/1990 | Wakatsuki et al. | 375/88 |
| 4,910,753 | 3/1990 | Wakatsuki et al. | 375/76 |
| 5,204,879 | 4/1993 | McConnell | 375/20 |

FOREIGN PATENT DOCUMENTS

| | | |
|---|---|---|
| 915179 | 6/1992 | Finland . |
| 60-174550 | 9/1985 | Japan . |
| WO91/05427 | 4/1991 | PCT Int'l Appl. .......... H04L 25/06 |

Primary Examiner—Stephen Chin
Attorney, Agent, or Firm—Perman & Green

[57] ABSTRACT

The invention comprises a digital detector used in a paging system. This detector has reference levels, against which the received signal is compared with a digital comparator (11). The reference levels can be changed with an updating logic (12), if changes are observed in the levels of the received signals. The detector may also compensate for differences between individual FM detectors.

12 Claims, 3 Drawing Sheets

DIGITAL DETECTOR

This invention relates to a digital detector for use in a paging system. Digital detection is understood to mean the conversion into a digital signal of a pager audio frequency signal, which contains a plurality of different signalling frequencies corresponding to a plurality of symbols, and the decoding of the symbol coding into serial data.

BACKGROUND OF THE INVENTION

The prior art is described below with reference to the accompanying FIG. 1 showing the circuit diagram of the comparator-detection, which is traditionally used as the detection method in prior art paging systems.

FIG. 1 shows the circuit diagram of the comparator-detection, which is traditionally used as the detection method in prior art paging systems. The incoming signal is modulated by 4 level frequency shift keying (4FSK), said modulated signal is received in the FM detection block 1. The FM detected and 4 level pulse amplitude modulated (4PAM) signal is supplied to the inputs of comparator-detectors (2-5), in which the signal is compared with fixed decision levels. The comparison result is the information about which symbol was received. The outputs of the comparators are connected tot he decoding & symbol decoding block 6, which provides the outgoing data.

A disadvantage of detectors with fixed levels, which is overcome by the present invention, is that their decision levels must be manually tuned in order to provide the best detection result.

In such prior art pagers the pager front ends before detection have varying electrical properties and the characteristics of the components in different pager units will change. This can lead to erroneous detection results in detectors with fixed levels. The components of the front end in a prior art pager with a detector with fixed levels must be of very high and uniform quality in order to avoid erroneous detection results.

Such prior art detectors with fixed levels do not react to changes in the signalling frequencies. An erroneous detection result will probably be the result if the signalling frequencies change compared with the pager.

SUMMARY OF THE INVENTION

According to the present invention there is provided a digital detector to convert an audio frequency signal into a digital signal, characterized in that the detector comprises an Analog/Digital (A/D) converter for producing a first binary word ($W_o$) corresponding tot he offset voltage of the detector, and a second binary word ($W_s$) corresponding to each detected signal. The digital detector further includes an offset voltage removal block in which the first binary word ($W_o$), corresponding to the offset of the detector, is subtracted from each second binary word ($W_s$), corresponding to each received signal, to provide a plurality of third binary words ($W_{ss}$) representing modified signal symbols corresponding to each received signal. The digital detector further includes a comparator for comparing each third binary word ($W_{ss}$) with a set of predetermined decision levels to determine an output symbol, and a block for updating the set of predetermined decision levels responsive to changes in the received audio frequency signals as represented in changes in the third binary words ($W_{ss}$).

BRIEF DESCRIPTION OF THE DRAWINGS

An embodiment of the invention is described in more detail below, by way of example, with reference tot he accompanying drawings, in which:

FIG. 1 is described above.

DETAILED DESCRIPTION OF THE INVENTION

Figure 1:
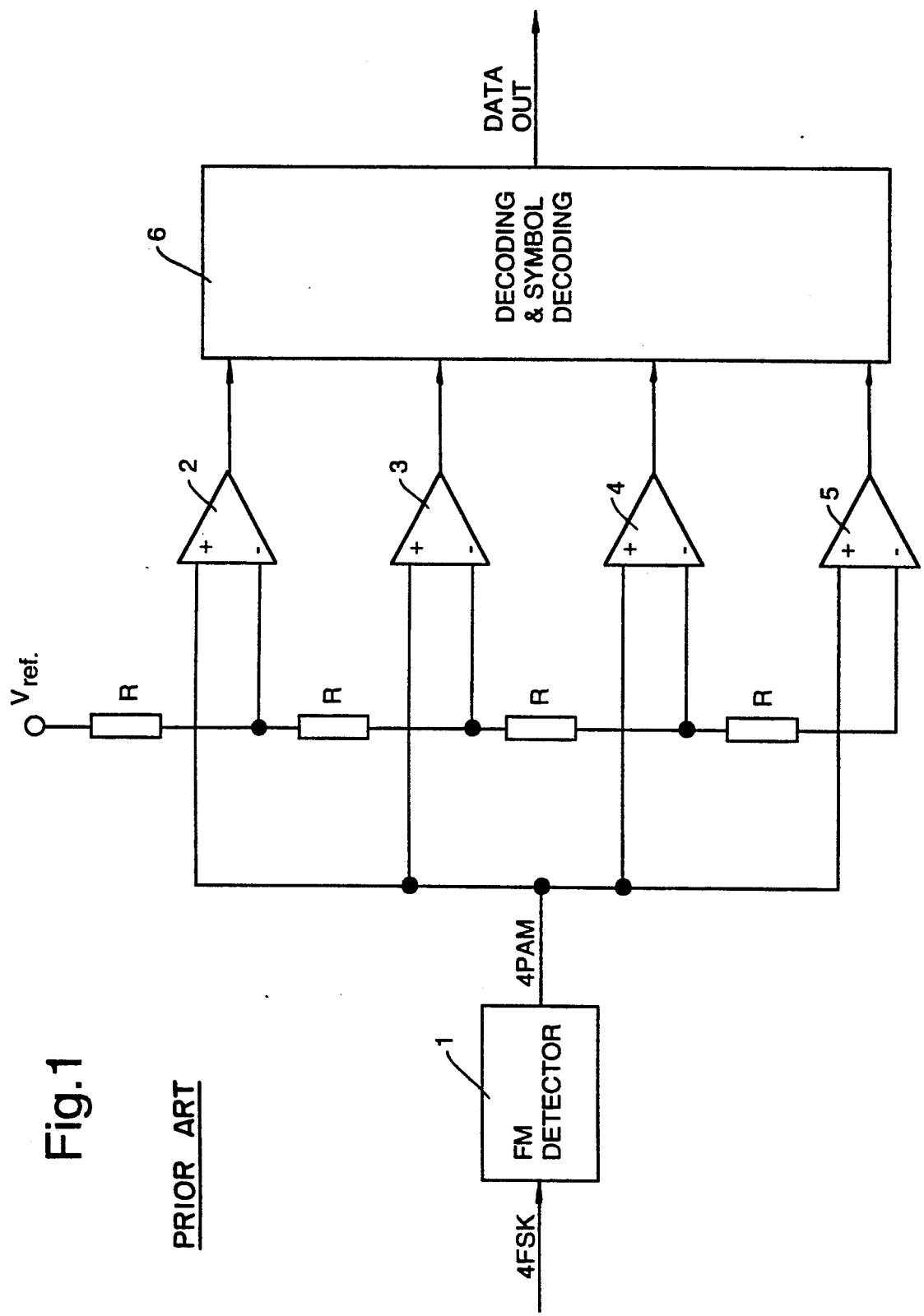
FIG. 1 shows the circuit diagram of the comparator-detector, which is traditionally used as the detection method in paging systems in accordance with the prior art.
Figure 2:
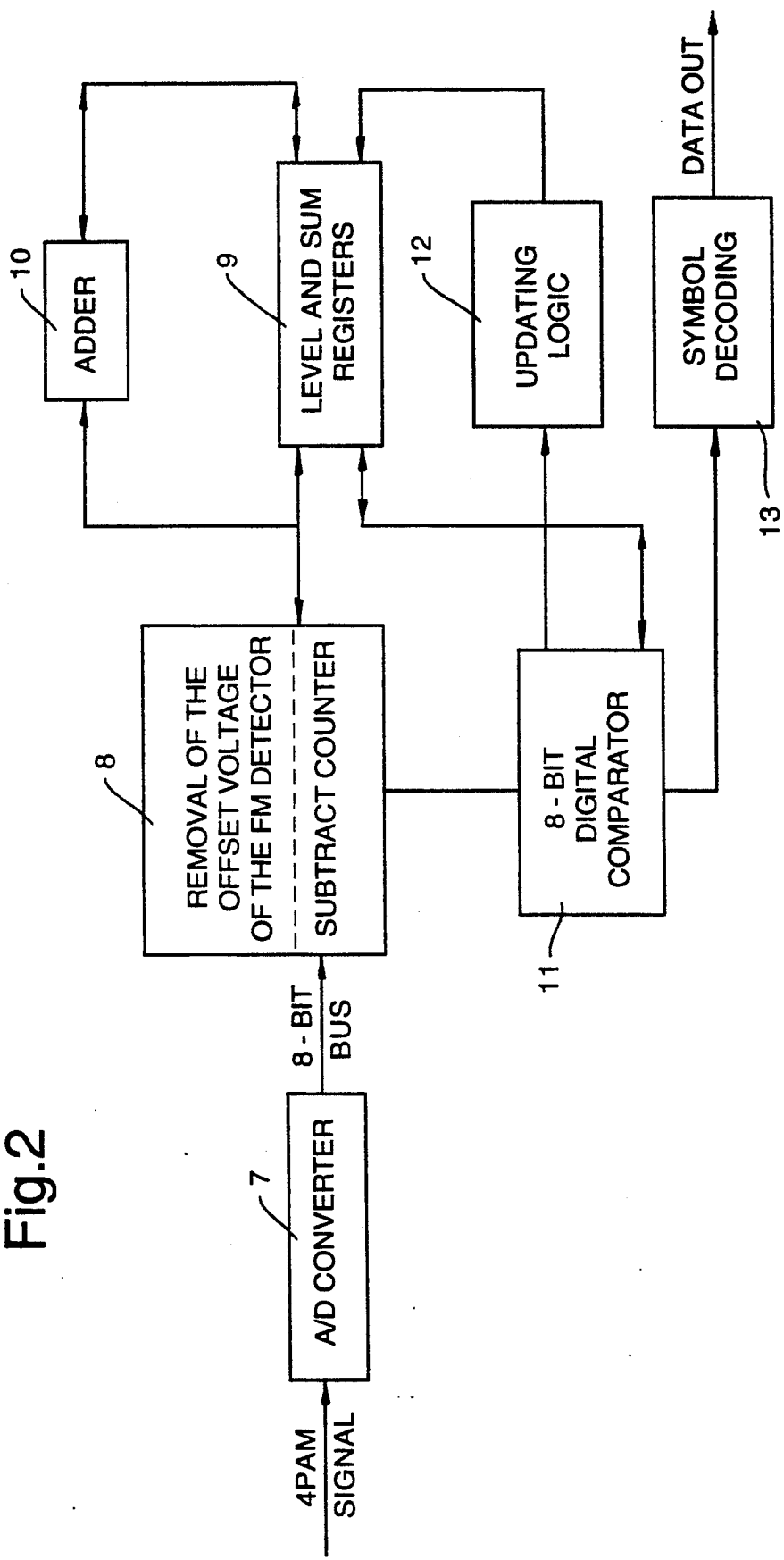
FIG. 2 shows a block diagram of the decision logic of the signal detector in accordance with the invention.

FIG. 2 shows a block diagram of the decision logic of the signal detector in accordance with the invention. When the 4 FSK modulated signal is detected with the FM detector, then the different voltage values are converted into digital ones with the A/D-converter 7. It is not necessary to scale the output of the A/D-converter 7 in any special way, if the conversion range is selected so that no overflow will occur.

In the beginning of every connection the radio is switched on before the data reception is started. During this time the receiver can be synchronized with the incoming data flow. When the signal is prevented from reaching the radio, the binary word $W_o$ corresponding to the offset voltages of the radio, the mixer and particularly of the FM detector can be read from the A/D-converter 7. This binary word $W_o$ is supplied to the logic, which reads and stores it in the register block 9 into a register allocated for it. From each binary word $W_s$ representing a received symbol and provided by the A/D-converter 7 the logic subtracts the FM detector's offset voltage, whereby individual differences of the FM detectors can be compensated for. The register block 9 contains also the decision levels and the alarm levels. An adder 10 is also connected to the register block 9. The 8-bit digital comparator 11 compares each input binary word $W_s$ with the decision levels and the alarm levels. The updating logic 12 updates the decision levels and the alarm levels. The system decoding logic 13 outputs serial data.

Figure 3:
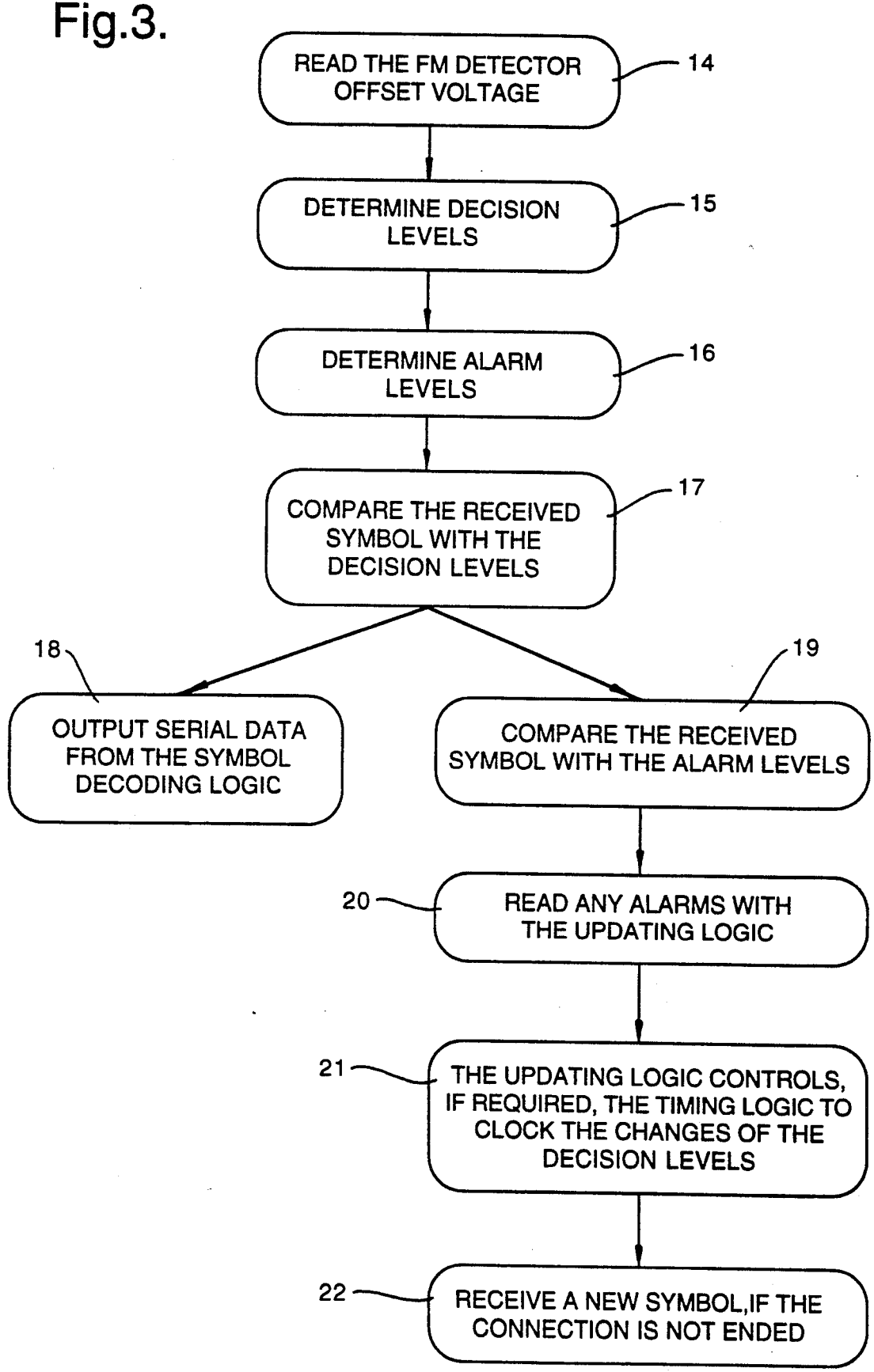
FIG. 3 shows a function diagram of the decision logic of the signal detector in accordance with the invention.

FIG. 3 shows a function diagram of the decision logic of the signal detector according to the invention. Each time when the pager starts its function and reads a new symbol 14, then the decision level determination function 15 of the decision logic determines a new decision level $l_1$, $l_2$ and $l_3$ corresponding to each symbol. The determination 15 of the symbol decision levels will be successful, because there is a so called preamble in the synchronizing part at the beginning of each batch of the protocol, the preamble containing only symbols "10" and $\int 00$". These symbols correspond tot he extremes of a 4 FSK modulated signal, so that the voltage values from the FM detector always correspond to the lowest $l_1$ and to the highest $l_3$ symbol decision level. The voltage values from the FM detector are converted into binary words. The symbols "10" and "00" are received alternately, and in the adder 10 a corresponding binary word is added to the sum of the register. Both symbols have in the register block 7 an own sum register, whose content is alternately loaded into the adder 10 to calculate the sum. A new sum will then again be stored into its own sum register to wait for addition. The decision levels of the symbols are determined on the basis of the average of four samples. In this case, when the average of four samples is calculated, it is easy to realize with a shift register. The data in the shift register is shifted two bits in the direction of the least significant bit, and the binary symbol "0" is loaded into the empty flip-flops. When the two decision levels are determined for the 4 FSK symbol, then the midmost decision level $l_2$ is simply the mean value of the former decision levels $l_1$ and $l_3$. Calculation of the midmost decision level is easily realized with the aid of digital addition and shifting of the sum in the shift register.

When the symbol decision levels $l_1$, $l_2$ and $l_3$ are determined 15, then the alarm level determination function 16 determines certain alarm levels, so that the symbol decision levels can be changed due to changes in the conditions or changes in the signal. This is a prerequisite to continue error free reception of a message, when the pager moves with different speeds during the same connection. The signal frequencies change with respect to the pager, when the pager moves with varying speeds. This can be explained with the Doppler-effect.

Then the decision logic is ready to receive a call. In the beginning of the call there is an address. If the pager identifies the address as being its own and finds that a call is arriving, the function continues. In the opposite case the connection is ended and the function continues at the beginning of a new connection.

Each message or signal symbol binary word $W_{ss}$ is in the comparison device 17 compared with the symbol decision levels $l_3$, $l_2$ and $l_1$. The comparison device 17 compares the absolute values of two binary words, or it compares the value of the respective word if it would be converted into a number of the decimal system. If the received word $W_s$ is greater than the decision level $l_3$, it will know that the received symbol was "10". If the received word $W_s$ is smaller than the decision level $l_3$, the decision level $l_2$ will be loaded into the comparison device. Then there is examined whether the absolute value of the word $W_{ss}$ is greater than the absolute value of the decision level $l_2$, and if so, then the received symbol is "11". If the absolute value of the word $W_s$ is smaller than the decision level $l_2$, the decision level $l_1$ will be loaded into the comparison device. Then there is examined whether the absolute value of the word $W_{ss}$ is greater than the absolute value of the decision level $l_1$, and if so, then the received symbol is "01". if the absolute value of the word $W_{ss}$ is smaller than the decision level, then the received symbol is "00". In this way the symbol logic 18 is able to output correct data from the decision logic.

It is possible to update the symbol decision levels with the updating logic. The updating logic calculates from the symbol decision levels an alarm level 19 for each symbol decision level according to a predetermined algorithm. When the binary word $W_s$ representing a received symbol is smaller than the lower alarm level $l_a$ of the detected symbol or greater than the upper alarm level $l_h$ of the detected symbol, then the updating logic will observe 20 the alarm which occurred. When a sufficient amount of alarms in a certain direction is obtained, then the symbol decision levels are changed 21 to reflect the new situation. The alarm levels are changed 16 in accordance with the change of symbol decision levels. The symbol decision levels and the alarm levels are changed before the next symbol is received. The symbol reception is continued in a normal way, and again the symbol levels are first compared 17 and 19 with the levels in the logic. Again, when there have occurred sufficiently many alarms, the decision levels are changed. In this way the decision levels and alarm levels are updated continuously in accordance with the symbol levels. Critical points in this solution are, however, the determination of original decision levels at the beginning of each connection, the function of the alarm level algorithm, and the algorithm to change decision levels.

The detector is able to remove the individual differences of the pager front and before the detection, in other words, the digital detector will see a front end with similar electrical characteristics, even when the component characteristics change in different pager units.

The digital detector will identify changes of the signalling frequencies, which occur in the transmission channel, and it is able to react on these. In this way the reception of a message can be continued substantially without errors, even though the signalling frequencies which correspond to the different symbols would change.

The invention can be realized in hardware or with a microprocessor. The hardware embodiment is preferred, because the detector is a lasting construction, which does not require modifications, and the microprocessor capacity can more effectively be used in other functions.

In view of the foregoing it will be clear to a person skilled in the art that modifications may be incorporated without departing from the scope of the present invention.

I claim:

1. A digital detector to convert an audio frequency signal into a digital signal, characterized in that the detector comprises:

an Analogue/Digital (A/D) converter (7), for producing a first binary word ($W_o$) corresponding to the offset voltage of the detector, and a second binary word ($W_s$) corresponding to each detected signal;

offset voltage removal means (8), in which the first binary word ($W_o$) corresponding to the offset voltage of the detector is subtracted from each second binary word ($W_s$) corresponding to each received signal to provide a plurality of third binary words ($W_{ss}$) representing modified signal symbols corresponding to each received signal;

means for comparing each third binary word ($W_{ss}$) with a set of predetermined decision levels to determine an output symbol; and means for updating the set of predetermined decision levels responsive to changes in the received audio frequency signals as represented in changes in the third binary words ($W_{ss}$).

2. A digital detector as claimed in claim 1, wherein the means (12) for updating the set of predetermined decision levels is responsive to the third binary word ($W_{ss}$) falling outside of a predetermined zone defined by upper and lower alarm levels ($l_a$, $l_h$) on a predetermined number of occasions.

3. A digital detector as claimed in claim 1, wherein each time a new signal is received by the detector the means for updating the set of predetermined decision levels determines a new set of decision levels ($l_1$, $l_2$ and $l_3$) corresponding to each new signal.

4. A digital detector as claimed in claim 3, wherein each signal comprises a preamble part utilized in determining the new set of decision levels the preamble containing only symbols '10" and "00" corresponding to the extremes of a four level frequency shift keying (4 FSK) modulated signal.

5. A digital detector as claimed in claim 3, wherein the means for updating the set of predetermined decision levels comprises a sum register for each symbol in the register (9), the contents of the register being loaded alternately to an adder in order to calculate a sum.

6. A digital detector as claimed in claim 3, wherein the decision levels $l_1$ and $l_3$ are determined on the basis of the average of four samples by shifting the data in a shift register two bits int he direction of the least significant bit, nd by loading the binary symbol "0" into empty flip-flops of the shift register and the midmost decision level $l_2$ is calculated as the means value of the former decision levels $l_1$ and $l_3$.

7. A digital detector as claimed in claim 1, wherein when the means for updating the predetermined set of decision levels detects the third binary word ($W_{ss}$) exceeding either of the alarm levels ($l_a$ or $l_h$) in a certain direction a sufficient amount of times, then the symbol decision levels (21) and alarm levels (16) are changed to reflect the changes in the third binary word ($W_{ss}$) before the next symbol is received.

8. A method for operating a digital detector for converting an audio frequency signal into a digital signal, comprising the steps of:
producing a first binary word ($W_o$) corresponding to an offset voltage of the detector and a second binary word ($W_s$) corresponding to each detected signal;
subtracting the first binary word ($W_o$) from each second binary word ($W_s$) to provide a plurality of third binary words ($W_{ss}$) representing modified signal symbols corresponding to each received signal;
comparing each third binary word ($W_{ss}$) with a set of predetermined decision levels to determine an output symbol; and
updating the set of predetermined decision levels in response to a change in the received audio frequency signals as represented by a change in the third binary words ($W_{ss}$).

9. A method as set forth in claim 8, wherein the step of updating includes a step of determining if the third binary word ($W_{ss}$) falls outside of a predetermined zone defined by upper and lower alarm levels ($l_a$, $l_h$) on a predetermined number of occasions.

10. A method as set forth in claim 8, wherein the step of updating is responsive to a new signal being received for determining a new set of decision levels $l_1$, $l_2$ and $l_3$) corresponding to each new signal.

11. A method as set forth in claim 10, wherein the step of determining a new set of decision levels is responsive to a preamble part of each signal, the preamble part containing only symbols "10" and "00" corresponding to extremes of a four level frequency shift keying (4 FSK) modulated signal.

12. A method as set forth in claim 8, wherein the step of updating includes a step of detecting the third binary word ($W_{ss}$) exceeding either of the alarm levels ($l_a$, $l_h$) in a certain direction a sufficient number of times, and then further including a step of changing the symbol decision levels and the alarm levels to reflect changes in the third binary word before a next symbol is received.

* * * * *